G. R. RAY.
VACUUM PAN FOR EVAPORATING APPARATUS.
APPLICATION FILED DEC. 3, 1906.
920,997.
Patented May 11, 1909.
3 SHEETS—SHEET 2.
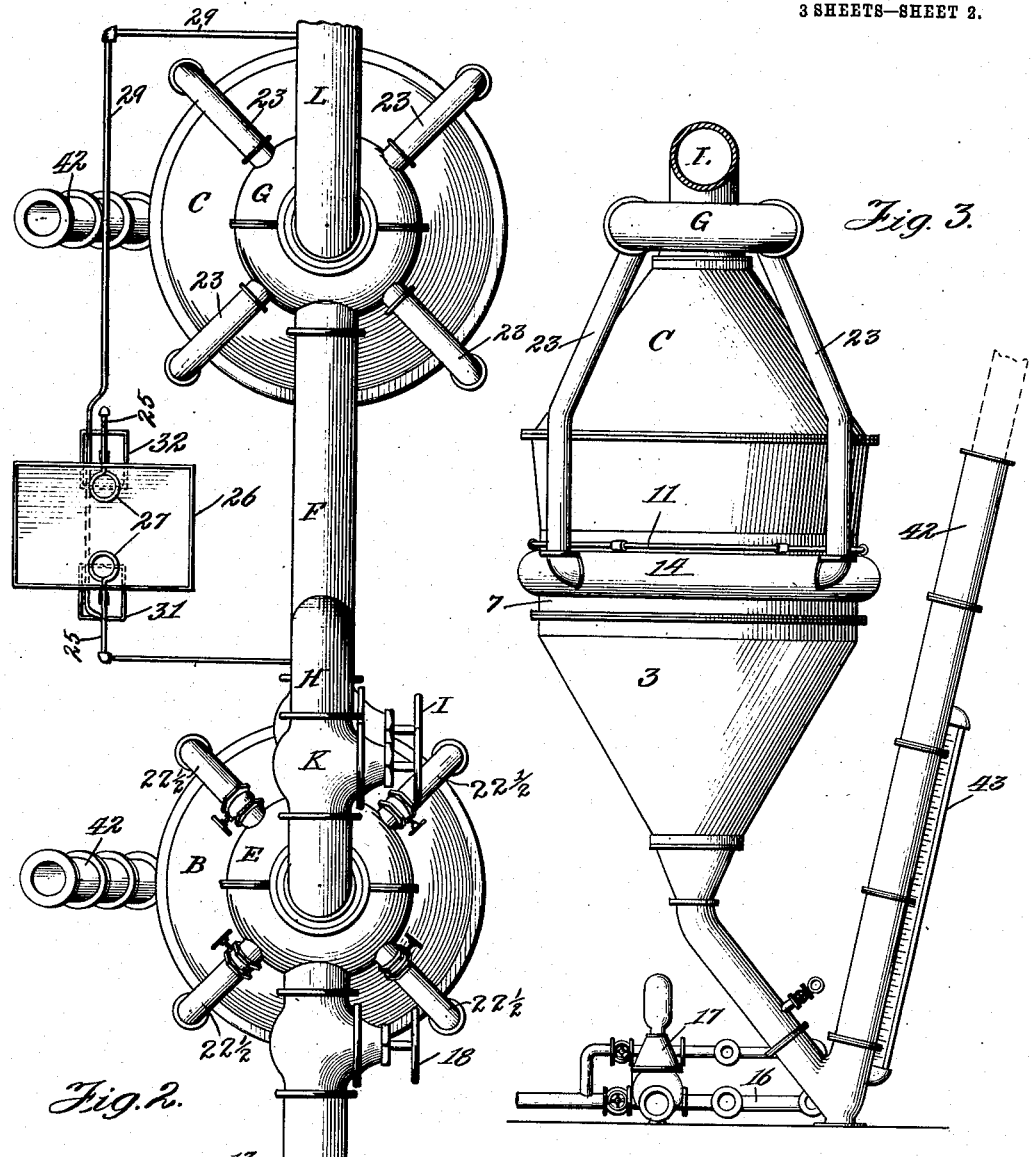
Fig. 2.
Fig. 3.
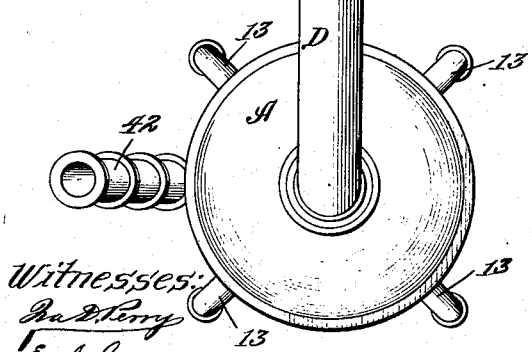
Witnesses:
Inventor:
George R. Ray.
By Hill & Hill
Attys.

G. R. RAY.
VACUUM PAN FOR EVAPORATING APPARATUS.
APPLICATION FILED DEC. 3, 1906

920,997.

Patented May 11, 1909.
3 SHEETS—SHEET 3.

Witnesses:

Inventor:
George R. Ray
By Hill & Hill, Attys.

UNITED STATES PATENT OFFICE.

GEORGE R. RAY, OF MANISTEE, MICHIGAN.

VACUUM-PAN FOR EVAPORATING APPARATUS.

No. 920,997.　　　Specification of Letters Patent.　　　Patented May 11, 1909.

Application filed December 3, 1906. Serial No. 346,036.

*To all whom it may concern:*

Be it known that I, GEORGE R. RAY, a citizen of the United States, residing at Manistee, in the county of Manistee and State of Michigan, have invented certain new and useful Improvements in Vacuum-Pans for Evaporating Apparatus, of which the following is a description.

My invention belongs to that general class of apparatus for evaporating brine and the like in which a plurality of vacuum pans are connected one with the other, in such a manner that the vacuum chamber of one pan is connected to the heating chamber of the next in such manner that the steam resulting from the process in the first pan is utilized for heating purposes in the second pan.

The object of my invention is to produce an apparatus with increased capacity for the purpose described, with substantially the same expenditure of steam or equivalent heating medium, thus greatly economizing the process.

To this end my invention consists in the novel construction, arrangement, and combination of parts herein shown and described, and more particularly pointed out in the claims.

Figure 1:
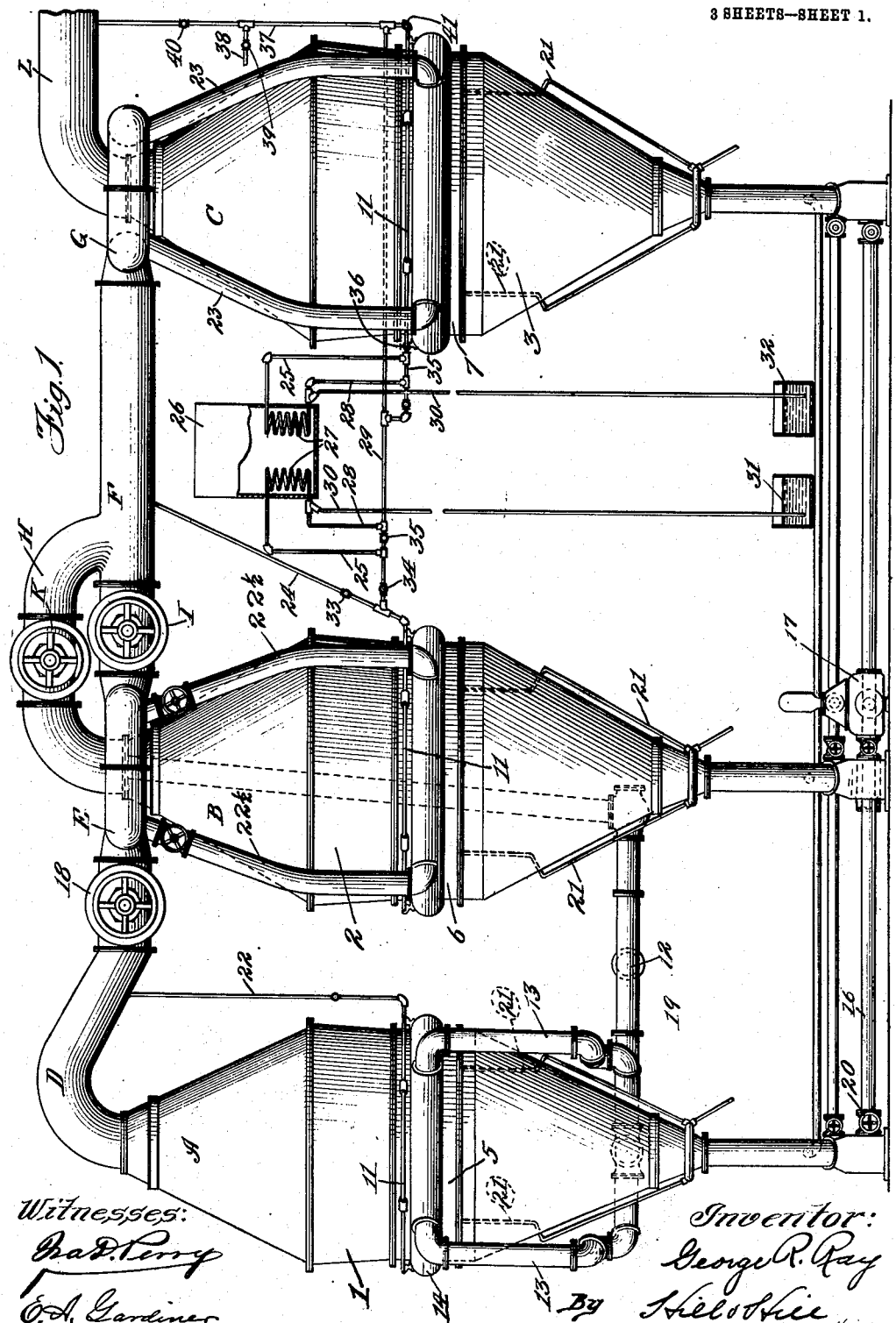
Figure 4:
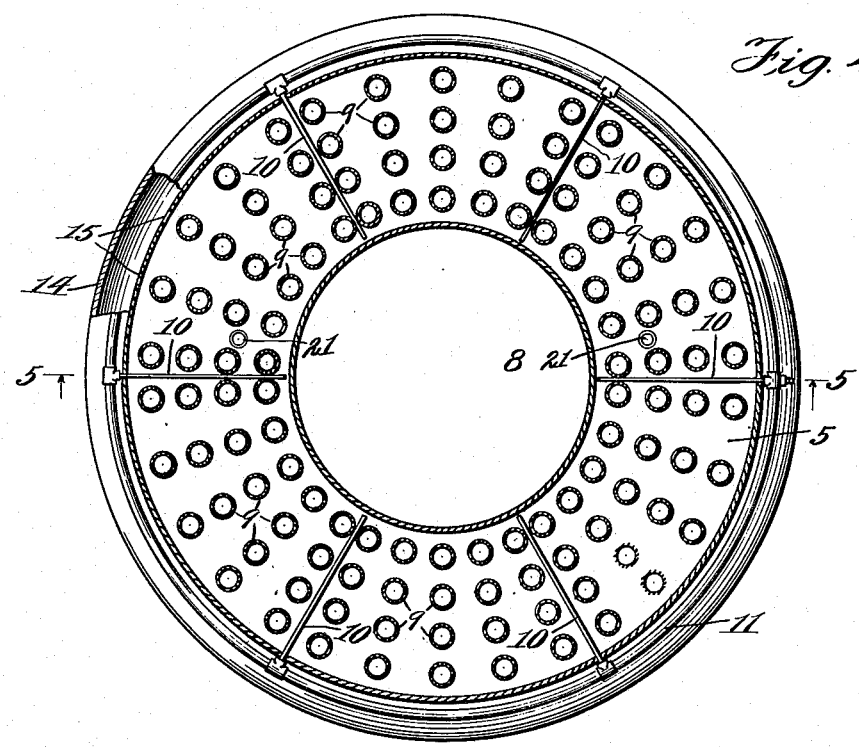
Figure 5:
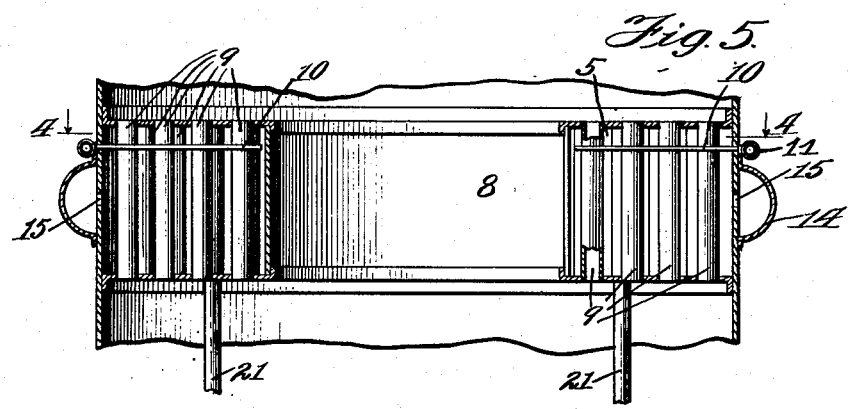

In the drawings wherein like reference characters indicate like or corresponding parts, Figure 1 is a side elevation of an apparatus illustrating my invention; Fig. 2 is a plan view of the same; Fig. 3 is a view of one of the plans taken at right angles to the view shown in Fig. 1. Fig. 4 is a horizontal sectional view through the steam belt, taken on line 4—4 of Fig. 5; and Fig. 5 is a vertical sectional view of the same, taken on line 5—5 of Fig. 4.

In an apparatus of this kind it is common to arrange each vacuum pan with an intermediate steam belt and to direct the liquid to be evaporated in contact therewith, the steam belt serving as an evaporating medium. The resultant steam or vapor is drawn from the pan by means of a partial vacuum to the steam belt of a second pan arranged substantially in the same manner, and, if desired, to other substantially similar pans forming a series. The object is to utilize the resultant vapor from one pan for evaporating purposes in the second or succeeding pans.

The object of devices of this kind, in order to secure the most perfect results and the most economical operation, is to automatically increase the vacuum to counterbalance the decrease in the temperature of the evaporating medium. After many years of practical experience in erecting such apparatus on a large scale, and carefully observing the results secured, I have found them to be more perfectly secured by increasing the dimensions of the steam belt and evaporating area of each succeeding pan, substantially as herein described.

In the drawings, I have shown a series of three pans, 1, 2, 3, arranged to be connected in series, or, for convenience in cleaning, so arranged that they may be connected in pairs if desired. It will be observed that the pans are gradually increased in size, for the purpose mentioned, and when used in triple form, as shown, I have secured very good results in practical operation by constructing them on the ratio of 18 feet in diameter for the first pan, 19 feet for the second pan, and 20 feet for the third pan. A fourth pan may be added, if desired, giving a quadruple effect, the fourth pan also preferably being larger than the third.

The pans are each provided with a steam belt, substantially the same in construction as shown, and a description of one will be sufficient for all. The steam belts in the pans shown, are numbered respectively 5, 6 and 7.

Referring particularly to Figs. 4 and 5, the steam belts are each annular, and each provided with a central opening 8, and a plurality of flues or tubes 9 through which the fluid may freely pass. A plurality of radial air pipes 10 is provided, preferably arranged near the top of the steam belt with the inner end extended nearly to the wall of the central aperture 8. The several air pipes are connected with a ring pipe 11, which is suitably connected with means for withdrawing the air from the belt, and thus creating a circulation of steam in the belt, drawing the same therethrough and in contact with the wall of the aperture 8. By locating the air pipes near the top of the steam belt, I am enabled to free the steam belt from any accumulation of air, which by reason of the change in temperature will tend to accumulate near the top of the belt, and thus air-lock the action to a certain extent. A steam pipe 12 conveys steam through one or more pipes 13, to a ring belt 14 arranged around the steam belt, the steam being admitted to the belt by means of suitable apertures 15 formed in the outer wall thereof, thus securing an even admission of the steam to the belt. The brine or other fluid is admitted to the pan by means of a pipe 16 by the operation of a suitable pump 17 or equivalent means, for the purpose.

The operation, as just described, is as follows: Steam being admitted to the steam belt, and means being provided to withdraw the air from the belt, the steam is caused to circulate through the belt, thus forming the evaporating or heating chamber, and medium for evaporating the fluid. The area of this chamber is governed by the size or dimensions of the steam belt, and the number and size of the tubes or flues 9, aided by the central aperture 8, and the circulation and temperature of the heating medium. The fluid being admitted to the bottom of the pan, rises toward the steam belt, and by reason of a partial vacuum created in the dome of the pan, is caused to circulate backward and forward through the steam belt. The upper part of the pan which I have termed the "vacuum chamber" I have designated by the letters A, B and C. The upper part of the vacuum chamber A is connected by a goose-neck "D" with a ring pipe E arranged about the top of the second pan. A valve 18 arranged in the gooseneck between the two pans, together with the valve 19 in the steam pipe, and the valve 20 in the fluid pipe, serve to cut off or disconnect the first pan from the second, when desired.

The construction of the first pan and its belt, and the volume of steam supplied thereto are preferably so proportioned and regulated as to secure substantially the complete condensation of the steam supplied thereto. Suitable pipes 21 connecting with the bottom of the steam pan are provided to carry away the water of condensation. It is, however, desirable, to secure the best and most economical results, that the volume of steam should be at least equal to the condensing capacity of the said steam belt, and to secure this result I prefer to connect the air ring pipe 11 of the first pan to the gooseneck D by means of a pipe 22. By this means any excess of steam not condensed in the belt would be conveyed to the gooseneck, together with the resultant air from the steam belt, and delivered into the current of steam from the vacuum chamber A to be employed therewith in the next succeeding pan. The steam ring pipe E of the second pan is provided with one or more connecting pipes 22½ extending to the steam belt 6 of the second pan. The upper part of the vacuum chamber B is connected by a suitable pipe F with a ring pipe G of the third pan C. In the preferred construction, a by-pipe H extends from the vacuum chamber B to the pipe F beyond valve I, said by-pipe being also provided with a valve K. The ring pipe G is connected by suitable pipes 23 with the steam belt 7 of the third pan.

The vacuum chamber C is provided with a pipe L, connected with a suitable vacuum pump, not shown. It is obvious that if desired a fourth or perhaps other pans may be interposed between the vacuum pump and the third pan, and auxiliary means may be employed to increase the height of the vacuum.

If desired, an air pipe 24 connecting with the air ring pipe 11 of the second pan may also be arranged to conduct the air from the steam belt 6 to the pipe F. In practice, however, I have not thought this necessary, and prefer to connect the said air pipe, as well as the air pipe of the steam belt 7, to auxiliary means for withdrawing the air from said belts. The preferred arrangement for this purpose will be referred to later.

In actual and practical operation on a large scale, with an apparatus substantially as described, I have secured very satisfactory results with a vacuum of 16½ inches in the vacuum chamber A, 25 inches in chamber B, and 28 inches in chamber C.

In practical operation, I have found it of value to provide means for ascertaining whether more steam than is necessary is being employed for the economical operation of the apparatus. Any preferred means may be employed for this purpose. I have secured satisfactory results in the practical operation by the apparatus herein shown and described. The air ring belt 11 of the second pan, as well as the first, if desired, is connected with a suitable pipe 25, extending into a vessel 26, and is preferably provided with a coil or equivalent construction 27 and return pipe 28 connected with the pipe 29, which in turn is connected with an auxiliary air pump (not shown). A pipe 30 connected to the return pipe 28 preferably at an angle is extended downward with its open end positioned in a suitable vessel 31. The pipe 30 serves to draw off water of condensation arising from steam in the pipe to vessel 31. Vessel 26 contains water or other suitable fluid to induce condensation in the coil 27.

It will be readily seen that if excess steam is employed it will be carried over in the pipe 25, condensed in the coil 27, and will be drained into the vessel 31. Visible means are thus provided to determine the amount of condensation, and thus the amount of steam carried over in the air pipes.

As shown, a duplicate construction is provided for the third pan, the coil of which may be positioned in the same vessel 26, and a separate receptacle 32 used for the water of condensation. In order to control the device if desired, a valve 33 may be positioned in the pipe 24, and a valve 34 between the air pipe 11 and the vertical pipe 25. A valve 35 is also preferably positioned in the pipe 29 between the pipes 25 and 28, and a valve 36 between the air pipe belt of the third pan and its testing device. As shown, the pipe 29 is connected to a pipe 37 which extends to and is connected with the main exhaust pipe L. A pipe 38 provided with a valve 39 extends to the auxiliary exhaust pump (not shown). A valve 40 is positioned in the pipe 37 between the pipe 38 and the main exhaust pipe L. As shown also, the air pipe 11 of the third pan likewise connects with the pipe 37, a valve 41 being positioned between such connection and the connection of the pipe 29 with said pipe 37. By means of these connections, the control and testing of the current of air may be manipulated as desired.

In constructing my apparatus, I preferably use some suitable means for indicating the vacuum on each pan and the balancing of same to some extent. As shown, the bottom of each pan is connected with an inclined leg 42, which consists of a pipe open at its upper end, preferably provided with suitable graduated sight glass 43.

It is obvious that before the vacuum is exerted upon the fluid in the pan, the fluid will rise to the same height in the pipe 42 that it is in the pan. As the vacuum is created the air pressure upon the fluid in the pipe 41 will depress the same. By means of the sight glass and the graduation there, visible means are provided for securing an accurate knowledge of the vacuum in each pan.

It is obvious that after having thus described my improvement, various immaterial modifications will be made without departing from the spirit of my invention. Hence I do not wish to be understood as limiting myself to the exact form, construction, or connections shown.

What I claim as new and desire to secure by Letters-Patent is:—

1. In an evaporating apparatus the combination with a plurality of evaporating pans each comprising a vacuum chamber and a steam belt, of a ring pipe extending around each steam belt upon the exterior thereof and communicating therewith, a vacuum line, pipes for establishing communication between each of the vacuum chambers and said vacuum line, a plurality of pipes leading to each ring pipe, the pipes of the first ring pipe leading from a source of steam supply and the pipes of the remaining ring pipes leading from the vacuum line, and means for conducting air from each steam belt to the vacuum line.

2. In a multiple vacuum pan steam evaporating apparatus, the combination of a plurality of evaporating pans arranged in proximity to each other, and in series each provided with a steam belt evaporator, with the vacuum chamber of one pan communicating with the steam belt of another pan, horizontal radially arranged air pipes positioned near the top of the steam belt and connected to a ring pipe, and a pipe extending from the ring-pipe to a goose-neck extending from the vacuum chamber of one pan to the steam conducting pipe of the other.

3. In an evaporating apparatus the combination with a plurality of evaporating pans each comprising a vacuum chamber and a steam belt, of a ring pipe extending around each steam belt upon the exterior thereof and communicating therewith, a vacuum line, pipes for establishing communication between each of the vacuum chambers and said vacuum line, a plurality of pipes leading to each ring pipe, the pipes of the first ring pipe leading from a source of steam supply and the pipes of the remaining ring pipes leading from the vacuum line, and means for conducting air from each steam belt to the vacuum line, said means comprising an air ring pipe extending around each steam belt, a plurality of radially disposed pipes extending from said ring pipes into the steam belts and pipes leading from the last named ring pipes to the vacuum line.

4. In an evaporating apparatus, an evaporating pan provided with a steam belt evaporator, means for admitting the steam thereto, and means for drawing air from the steam belt, in combination with a condenser through which the air is passed, and a drain for drawing off the resultant water from said condenser pipe to a sight vessel, whereby the quantity of steam passing into said air pipe may be ascertained.

5. In an evaporating apparatus, the combination of a plurality of evaporating pans arranged in proximity to each other, each provided with a steam belt evaporator, with the vacuum chamber of one pan communicating with the steam belt of another pan, a pipe for drawing off air from each steam belt, and means for independently condensing the steam carried in any of said pipes and draining the resultant fluid therefrom.

In testimony whereof, I have hereunto signed my name in the presence of two subscribing witnesses.

GEORGE R. RAY.

Witnesses:
FRANK R. FOWLER,
LILLIAN F. WHITE.